(12) United States Patent
Lu et al.

(10) Patent No.: US 11,599,137 B2
(45) Date of Patent: Mar. 7, 2023

(54) JOYSTICK ASSEMBLY AND GAME CONTROLLER

(71) Applicant: DEXIN CORP., New Taipei (TW)

(72) Inventors: Ho Lung Lu, New Taipei (TW); Yuan-Jung Chang, New Taipei (TW)

(73) Assignee: DEXIN CORP., New Taipei (TW)

( * ) Notice: Subject to any disclaimer, the term of this patent is extended or adjusted under 35 U.S.C. 154(b) by 0 days.

(21) Appl. No.: 17/737,856

(22) Filed: May 5, 2022

(65) Prior Publication Data

US 2022/0357761 A1 Nov. 10, 2022

Related U.S. Application Data

(60) Provisional application No. 63/184,553, filed on May 5, 2021.

(30) Foreign Application Priority Data

Dec. 22, 2021 (TW) .................................. 110148204

(51) Int. Cl.
*G06F 3/033* (2013.01)
*G05G 9/047* (2006.01)
*A63F 13/24* (2014.01)

(52) U.S. Cl.
CPC ............. *G05G 9/047* (2013.01); *A63F 13/24* (2014.09); *A63F 2300/1018* (2013.01); *A63F 2300/1043* (2013.01)

(58) Field of Classification Search
CPC ........ G06F 1/169; G06F 3/033; G06F 3/0338; G06F 3/0346; G06F 3/038; A63F 13/24; A63F 2300/1018
See application file for complete search history.

(56) References Cited

U.S. PATENT DOCUMENTS

| | | | | |
|---|---|---|---|---|
| 6,580,418 | B1 * | 6/2003 | Grome .................... | A63F 13/22 345/161 |
| 8,264,458 | B2 * | 9/2012 | Cooper ................... | G05G 9/047 345/161 |
| 9,170,658 | B2 * | 10/2015 | Quek ...................... | G06F 3/0338 |
| 10,556,174 | B2 * | 2/2020 | Nelson .................... | G06F 3/038 |
| 2002/0190945 | A1 * | 12/2002 | Arita ....................... | G05G 9/047 345/156 |
| 2005/0255915 | A1 * | 11/2005 | Riggs ..................... | A63F 13/24 463/37 |
| 2011/0105231 | A1 * | 5/2011 | Ambinder ............... | A63F 13/24 463/38 |
| 2013/0100021 | A1 * | 4/2013 | Larsen ................... | A63F 13/214 345/161 |
| 2014/0083833 | A1 * | 3/2014 | Desplaines ............ | H01H 21/12 200/6 A |

(Continued)

*Primary Examiner* — Joe H Cheng
(74) *Attorney, Agent, or Firm* — Maschoff Brennan

(57) ABSTRACT

A joystick assembly applicable to a game controller includes a base, a shaft, a movement sensing device, a memory and a processor. The shaft is pivotally disposed at the base. The movement sensing device is disposed in the base and configured to sense the movement of the shaft relative to the base to generate a movement signal. The memory is disposed in the base and stores an identification number of the joystick assembly and pieces of calibration data. The processor is disposed in the base and configured to determine whether to output the movement signal according to the calibration data.

20 Claims, 2 Drawing Sheets

(56) References Cited

U.S. PATENT DOCUMENTS

2016/0334830 A1* 11/2016 Sirohiwala ............... G05G 5/05
2016/0361635 A1* 12/2016 Schmitz .................. A63F 13/22
2017/0255279 A1*  9/2017 McClive ................. A63F 13/22
2018/0104574 A1*  4/2018 Tager ...................... A63F 13/20
2019/0126140 A1*  5/2019 Nelson .................... A63F 13/22
2020/0164269 A1*  5/2020 Palmer .................... A63F 13/22

* cited by examiner

JOYSTICK ASSEMBLY AND GAME CONTROLLER

CROSS-REFERENCE TO RELATED APPLICATIONS

This non-provisional application claims priority under 35 U.S.C. § 119(a) on provisional application No(s). 63/184,553 filed in U.S.A. on May 5, 2021 and Patent Application No(s). 110148204 filed in Taiwan (R.O.C.) on Dec. 22, 2021, the entire contents of which are hereby incorporated by reference.

BACKGROUND

1. Technical Field

The present disclosure relates to a joystick assembly, and particularly relates to a joystick assembly for a game controller.

2. Related Art

A joystick assembly is widely applied to a game controller or the other apparatus needed to obtain a coordinate input. By controlling the joystick assembly, a character or an object in a game may be controlled to move. Because there is a difference between an actual generated structure of the joystick assembly and a design diagram, for example, a shaft is not totally vertical to a setting face, this difference results in a large deviation between an expected control position of a user and a control position actually reacted by the joystick assembly.

Hence, performing a calibration on the joystick assembly is an essential work. Recently, performing the calibration on the joystick assembly is all entire equipment calibration on the market. Namely, the calibration on the joystick assembly is performed after the joystick assembly and the other elements are all installed at the body of the game controller.

SUMMARY

In the light of the aforementioned description, the present disclosure sets forth a joystick assembly and a game controller.

According to an embodiment of the present disclosure, a joystick assembly applicable to a game controller includes a base, a shaft, a movement sensing device, a memory and a processor. The shaft is pivotally disposed at the base. The movement sensing device is disposed in the base and is configured to sense a movement of the shaft relative to the base to generate a movement signal. The memory is disposed in the base and stores an identification number of the joystick assembly and a plurality of pieces of calibration data. The processor is disposed in the base and is electrically coupled to the movement sensing device and the memory. The processor is configured to determine whether to output the movement signal or not according to the plurality of pieces of calibration data.

According to an embodiment of the present disclosure, the game controller includes a joystick assembly and a body. The joystick assembly is pluggably disposed at the body and includes a base, a shaft, a movement sensing device, a memory and a processor. The shaft is pivotally disposed at the base. The movement sensing device is disposed in the base and is configured to sense a movement of the shaft relative to the base to generate a movement signal. The memory is disposed in the base and stores an identification number of the joystick assembly and a plurality of pieces of calibration data. The processor is disposed in the base and is electrically coupled to the movement sensing device and the memory. The processor is configured to determine whether to output the movement signal or not according to the plurality of pieces of calibration data.

By the aforementioned structure, for the joystick assembly and the game controller disclosed by the present disclosure, the joystick assembly itself is provided with the memory and the processor, wherein the memory stores the identification number of the joystick assembly to provide the processes of data collection, data tracking, data analysis and so on. Besides, the memory of the joystick assembly stores the pieces of calibration data for the processor to determine whether to output an input signal or not. In other words, the joystick assembly may complete the calibration before the joystick assembly is out of the factory or is installed in the game controller so as to avoid the problem of the conventional entire equipment that components need to be checked one by one when the signal of the equipment is not good and therefore much calibration is taken.

DETAILED DESCRIPTION

Figure 1:
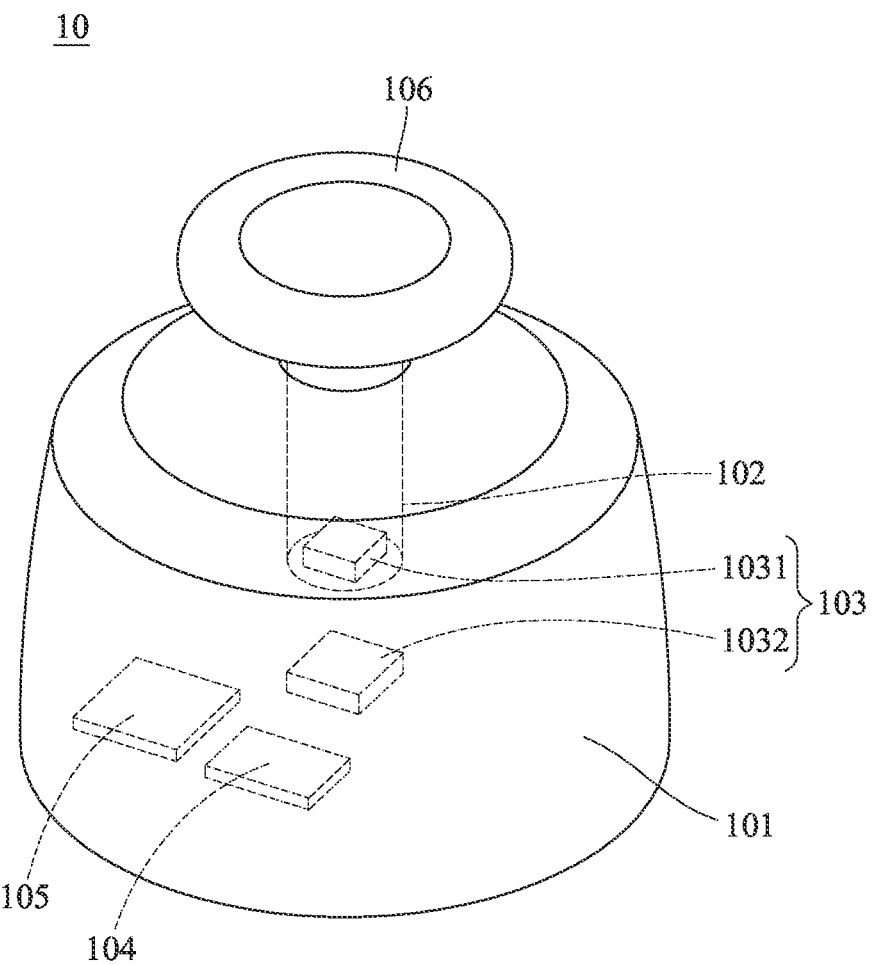
FIG. 1 is a schematic diagram of a joystick assembly according to one embodiment of the present disclosure.

Please refer to FIG. 1, which is a schematic diagram of a joystick assembly according to one embodiment of the present disclosure. As illustrated in FIG. 1, the joystick assembly 10 includes a base 101, a shaft 102, a movement sensing device 103, a memory 104 and a processor 105. The shaft 102 is pivotally disposed at the base 101 and a joystick cap 106 may be installed on the shaft 102. It should be noted that FIG. 1 exemplarily illustrates the shapes of the base 101 and the joystick cap 106 of the joystick assembly 10 instead of intending to limit the present disclosure.

The movement sensing device 103 is disposed in the base 101 and is configured to sense the movement of the shaft 102 relative to the base 101 to generate a movement signal. The movement sensing device 103 includes one or more magnetic components 1031 and a Hall integrated circuit 1032. The magnetic component 1031 may be implemented by a magnet or the other magnetic material and is disposed on the terminal, located in the base 101, of the shaft 102. The Hall integrated circuit 1032 may be disposed in the base 101 and is configured to sense the movement of the magnetic component 1031 as the shaft 102 moves relative to the base 101 to generate a movement signal. Specifically, the Hall integrated circuit 1032 may include Hall effect sensors and a signal processing circuit, the said Hall effect sensors may respectively detect magnetic field sensing signals, and the signal processing circuit may process the said magnetic field sensing signals to generate digital signals corresponding to the movements on the x-axis and the y-axis as the said movement signal.

In another embodiment, the movement sensing device 103 may comprise at least two potentiometers. The said at least two potentiometers output voltage values corresponding to the movements on the x-axis and the y-axis respectively following the movement of the shaft 102 relative to the base 101, wherein the voltage values serve as the said movement signal.

The memory 104 is disposed in the base 101. The memory 104 may be a read-only memory (ROM), a flash memory, a dynamic random access memory (DRAM), a static random access memory (SRAM) or the other non-volatile memory. The memory 104 may store an identification number of the joystick assembly and pieces of calibration data. The identification number of the joystick assembly may indicate a production batch number of the joystick assembly 10. The calibration data may include a static signal and a virtual true circle, and wherein the static signal indicates a signal (such as a voltage value, a current value, etc.) detected by the movement sensing device 103 when the shaft 102 is not moved by any external force and the virtual true circle indicates a movement range of the shaft 102 with respect to the base 101. Besides, the memory 104 may be electrically coupled to the movement sensing device 103 and may store the signal detected by the movement sensing device 103.

Specifically, the memory 104 may further be controlled to output one or more of the identification number of the joystick assembly, the pieces of calibration data and the signal detected by the movement sensing device 103 for an external processing device to perform processes of collection, tracking, analysis and so on of the data of the joystick assembly 10. In particular, the external processing device may read the identification numbers and the pieces of calibration data of multiple joystick assemblies and accordingly perform a processing procedure of analyzing the calibration data of joystick assemblies that belong to the same production batch number or a processing procedure of comparing the calibration data of joystick assemblies with different production batch numbers and so on. For example, the external processing device may utilize the calibration data of all the joystick assemblies with the same identification number to analyze a yield rate of these joystick assemblies produced in the same production batch.

The processor 105 is disposed in the base 101 and is electrically coupled to the movement sensing device 103 and the memory 104. The processor 105 may be implemented by a central processing unit. In particular, the processor 105 and the aforementioned memory 104 may be included in a microcontroller; that is, the processor 105 and the memory 104 may be implemented by a processor and a memory in the microcontroller. The processor 105 is configured to determine whether to output the movement signal or not according to the pieces of calibration data. Specifically, the calibration data may include the static signal and the virtual true circle, and the processor 105 may utilize the static signal and the virtual true circle to obtain 2D coordinates and may determine whether the 2D coordinates are in the virtual true circle or not. The processor 105 outputs the movement signal if the 2D coordinates are in the virtual true circle. The processor 105 does not output the movement signal if the 2D coordinates are not in the virtual true circle. The 2D coordinates and the virtual true circle belong to the same coordinate system. The data contents indicated by the 2D coordinates and the virtual true circle are the same as those described in the former paragraphs and are not repeated. By regarding the virtual true circle as a calibration indicator, there is no need to particularly design structure according to a sensing range of the movement sensing device 103 of the joystick assembly to limit a moving range of the shaft 102, and cost of the structure design is lowered.

In particular, the Hall integrated circuit 1032, the memory 104 and the processor 105 of the said movement sensing device 103 may be disposed on one circuit board.

In one embodiment, the movement sensing device 103 is further configured to generate the static signal associated with the shaft 102, a horizontal movement limit signal and a vertical movement limit signal in addition to performing the operation of the aforementioned embodiment. The static signal indicates the signal detected by the movement sensing device 103 when the shaft 102 is not moved by any external force. The horizontal movement limit signal indicates the signal detected by the movement sensing device 103 when the shaft 102 is moved to the limit on the horizontal direction. The vertical movement limit signal indicates the signal detected by the movement sensing device 103 when the shaft 102 is moved to the limit on the vertical direction. In addition to the operation of the aforementioned embodiment, the processor 105 is further configured to perform zero calibration operation according to the static signal, and to perform virtual true circle calibration operation according to the static signal associated with the shaft 102, the horizontal movement limit signal and the vertical movement limit signal, and to store a result of the virtual true circle calibration operation and the static signal into the memory 104 as the pieces of calibration data.

Specifically, the zero calibration operation performed by the processor 105 includes regarding the 2D coordinates corresponding to the static signal as the coordinates of the center. The virtual true circle calibration operation performed by the processor 105 includes: utilizing the static signal and the horizontal movement limit signal to obtain an x-coordinate; utilizing the static signal and the vertical movement limit signal to obtain a y-coordinate; transforming the x-coordinate and the y-coordinate into polar coordinates to obtain a radius; utilizing the radius and the aforementioned coordinates of the center to obtain the virtual true circle as the result of the virtual true circle calibration operation which is one of the pieces of calibration data. The movement of the aforementioned shaft 102 may be manipulated by a user or a mechanical arm of a testing apparatus and the processor 105 may be triggered by the user or the testing apparatus to perform the aforementioned calibration operation.

In particular, the piece of calibration data may be obtained by the operation of the movement sensing device 103 and the processor 105 before the joystick assembly 10 is out of the factory. Or, the joystick assembly 10 may update the calibration data by performing the aforementioned operation of the movement sensing device 103 and the processor 105 again.

Figure 2:
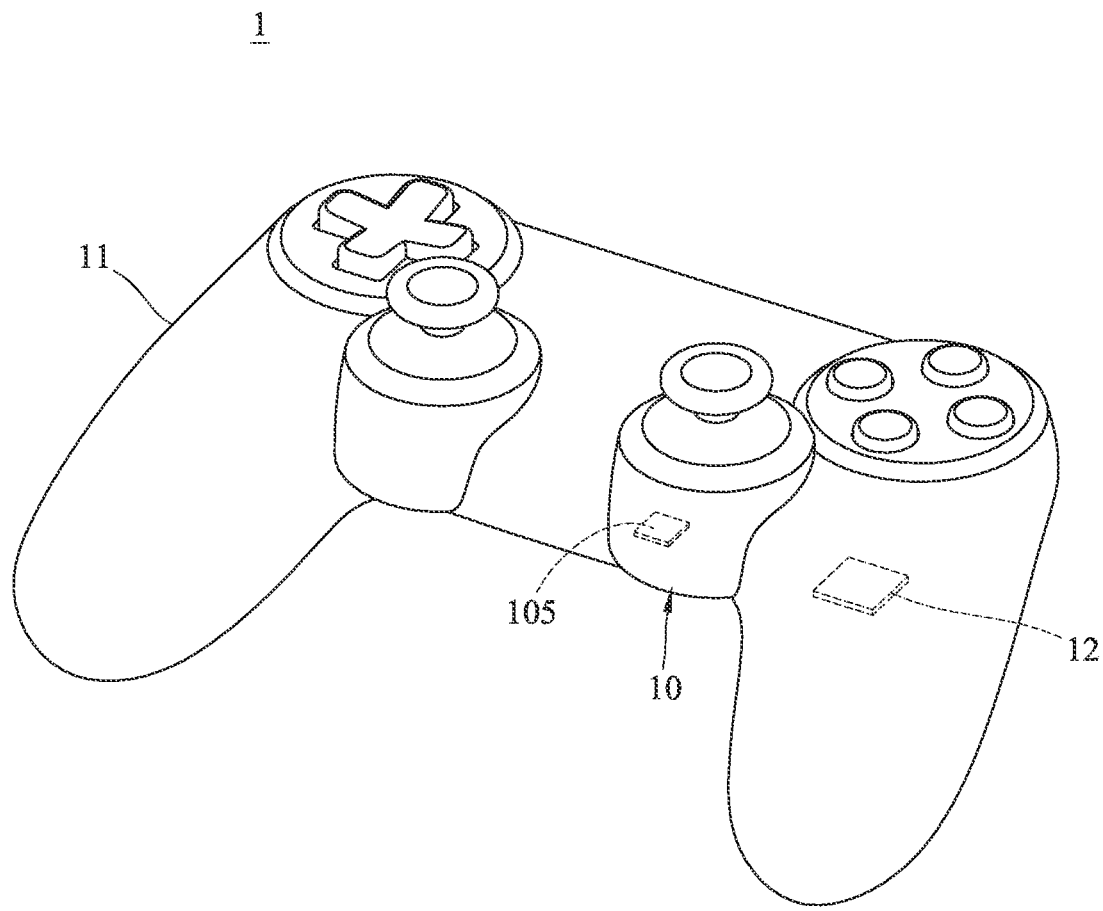
FIG. 2 is a schematic diagram of a game controller according to one embodiment of the present disclosure.

Please refer to FIG. 2, which is a schematic diagram of a game controller according to one embodiment of the present disclosure. As illustrated in FIG. 2, the game controller 1 may include a body 11 and one or more joystick assemblies 10, wherein each joystick assembly 10 may be pluggably disposed at the body 11 and may be the joystick assembly 10 in any one of the aforementioned embodiments. Specifically, the game controller 1 may further comprise a processing device 12. The processing device 12 is disposed in the body 11 and may be coupled to the processor 105 by wire connection or wireless connection. The processing device 12 may be disposed in a region other than the region where the joystick assembly 10 is disposed in the body 11. The processing device 12 may be disposed on a circuit board different from the circuit board where the processor 105 is disposed. The processing device 12 may be implemented by a microcontroller and is configured to receive the movement signal determined to be output by the processor 105 according to the pieces of calibration data. The processing device 12 may perform signal processing on the movement signal or combine the movement signal and a control signal from another control assembly such as a circle button, a D-pad and so on of the game controller 1 for analysis and/or processing, but the present disclosure is not limited thereto.

By the aforementioned structure, for the joystick assembly and the game controller disclosed by the present disclosure, the joystick assembly itself is provided with the memory and the processor, wherein the memory stores the identification number of the joystick assembly to provide the processes of data collection, data tracking, data analysis and so on. Besides, the memory of the joystick assembly stores the pieces of calibration data for the processor to determine whether to output an input signal or not. In other words, the joystick assembly may complete the calibration before the joystick assembly is out of the factory or is installed in the game controller so as to avoid the problem of the conventional entire equipment that components need to be checked one by one when the signal of the equipment is not good and therefore much calibration is taken.

What is claimed is:

1. A joystick assembly, applicable to a game controller, comprising:
    a base;
    a shaft pivotally disposed at the base;
    a movement sensing device disposed in the base and configured to sense a movement of the shaft relative to the base to generate a movement signal;
    a memory disposed in the base and storing an identification number of the joystick assembly and a plurality of pieces of calibration data; and
    a processor disposed in the base, electrically coupled to the movement sensing device and the memory, and configured to determine whether to output the movement signal or not according to the plurality of pieces of calibration data.

2. The joystick assembly according to claim 1, wherein the movement sensing device comprises:
    a magnetic component disposed on one terminal, located in the base, of the shaft; and
    a Hall integrated circuit disposed in the base and configured to sense a movement of the magnetic component as the shaft moves relative to the base to generate a digital signal, wherein the digital signal serves as the movement signal.

3. The joystick assembly according to claim 1, wherein the memory and the processor are included in a microcontroller.

4. The joystick assembly according to claim 1, wherein the plurality of pieces of calibration data comprise a virtual true circle and a static signal and determining whether to output the movement signal or not according to the plurality of pieces of calibration data performed by the processor comprises:
    utilizing the static signal and the movement signal to obtain 2D coordinates;
    determining whether the 2D coordinates are in the virtual true circle or not;
    outputting the movement signal if the 2D coordinates are in the virtual true circle; and
    not outputting the movement signal if the 2D coordinates are not in the virtual true circle.

5. The joystick assembly according to claim 1, wherein:
    the movement sensing device is further configured to generate a static signal associated with the shaft, a horizontal movement limit signal and a vertical movement limit signal, and
    the processor is further configured to perform a calibration operation according to the static signal, the horizontal movement limit signal and the vertical movement limit signal and store a result of the calibration operation and the static signal into the memory as the plurality of pieces of calibration data.

6. The joystick assembly according to claim 5, wherein performing the calibration operation performed by the processor comprises:
    utilizing the static signal and the horizontal movement limit signal to obtain an x-coordinate;
    utilizing the static signal and the vertical movement limit signal to obtain a y-coordinate; and
    transforming the x-coordinate and the y-coordinate into polar coordinates to obtain a virtual true circle serving as the result of the calibration operation.

7. The joystick assembly according to claim 5, wherein the memory is further configured to be controlled to output one or more of the identification number of the joystick assembly and the plurality of pieces of calibration data.

8. A game controller comprising:
    a body; and
    a joystick assembly according to claim 1, pluggably disposed at the body.

9. The game controller according to claim 8, further comprising:
    a processing device disposed in the body and coupled to the processor, and configured to receive the movement signal determined to be output by the processor according to the plurality of pieces of calibration data.

10. The game controller according to claim 8, wherein the movement sensing device comprises:
    a magnetic component disposed on one terminal, located in the base, of the shaft; and
    a Hall integrated circuit disposed in the base and configured to sense a movement of the magnetic component as the shaft moves relative to the base to generate a digital signal, wherein the digital signal serves as the movement signal.

11. The game controller according to claim 10, further comprising:
    a processing device disposed in the body and coupled to the processor, and configured to receive the movement signal determined to be output by the processor according to the plurality of pieces of calibration data.

12. The game controller according to claim 8, wherein the memory and the processor are included in a microcontroller.

13. The game controller according to claim 12, further comprising:
    a processing device disposed in the body and coupled to the processor, and configured to receive the movement signal determined to be output by the processor according to the plurality of pieces of calibration data.

14. The game controller according to claim 8, wherein the plurality of pieces of calibration data comprise a virtual true circle and a static signal and determining whether to output the movement signal or not according to the plurality of pieces of calibration data performed by the processor comprises:

utilizing the static signal and the movement signal to obtain 2D coordinates;

determining whether the 2D coordinates are in the virtual true circle or not;

outputting the movement signal if the 2D coordinates are in the virtual true circle; and not outputting the movement signal if the 2D coordinates are not in the virtual true circle.

15. The game controller according to claim 14, further comprising:

a processing device disposed in the body and coupled to the processor, and configured to receive the movement signal determined to be output by the processor according to the plurality of pieces of calibration data.

16. The game controller according to claim 8, wherein:

the movement sensing device is further configured to generate a static signal associated with the shaft, a horizontal movement limit signal and a vertical movement limit signal, and the processor is further configured to perform a calibration operation according to the static signal, the horizontal movement limit signal and the vertical movement limit signal and store a result of the calibration operation and the static signal into the memory as the plurality of pieces of calibration data.

17. The game controller according to claim 16, further comprising:

a processing device disposed in the body and coupled to the processor, and configured to receive the movement signal determined to be output by the processor according to the plurality of pieces of calibration data.

18. The game controller according to claim 16, wherein performing the calibration operation performed by the processor comprises:

utilizing the static signal and the horizontal movement limit signal to obtain an x-coordinate;

utilizing the static signal and the vertical movement limit signal to obtain a y-coordinate; and transforming the x-coordinate and the y-coordinate into polar coordinates to obtain a virtual true circle serving as the result of the calibration operation.

19. The game controller according to claim 18, further comprising:

a processing device disposed in the body and coupled to the processor, and configured to receive the movement signal determined to be output by the processor according to the plurality of pieces of calibration data.

20. The game controller according to claim 16, wherein the memory is further configured to be controlled to output one or more of the identification number of the joystick assembly and the plurality of pieces of calibration data.

* * * * *